April 19, 1949.  C. J. ANDERSON  2,467,546
MACHINE FOR CUTTING SHEET MATERIAL
Filed July 25, 1945  2 Sheets-Sheet 2
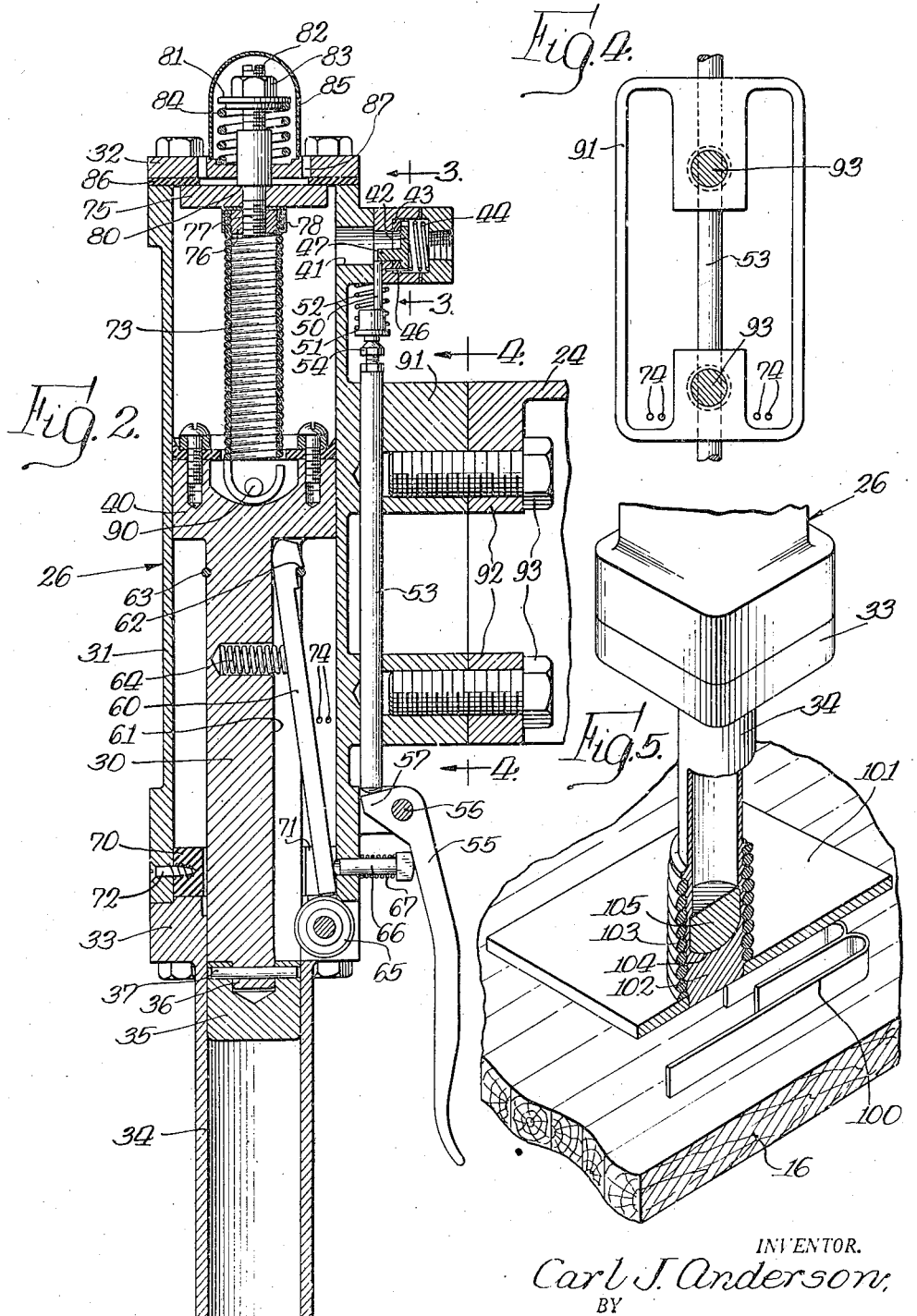
INVENTOR.
Carl J. Anderson,
BY
Davis, Lindsey, Smith & Shonts
Attys.

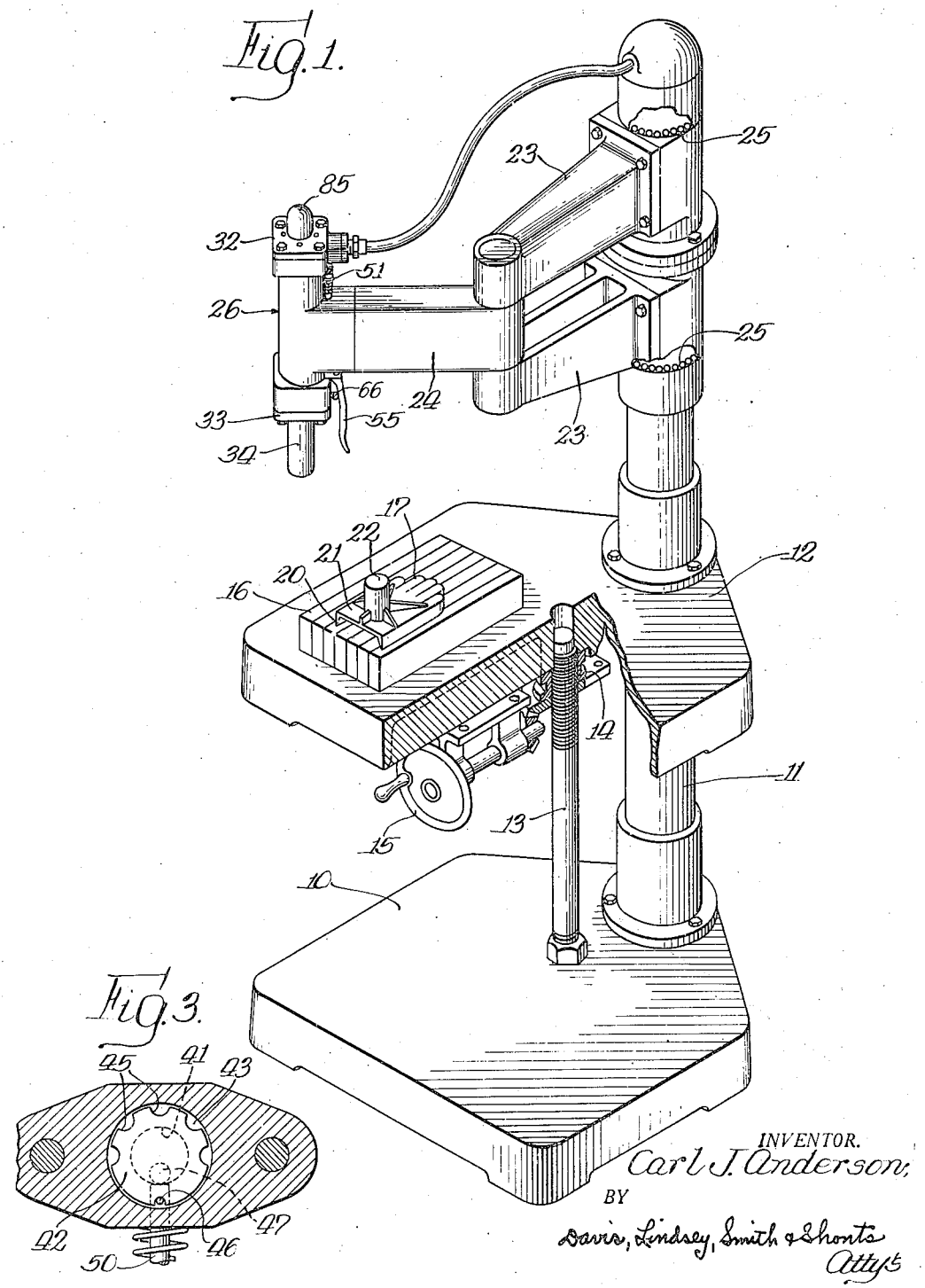

Patented Apr. 19, 1949

2,467,546

UNITED STATES PATENT OFFICE 2,467,546

MACHINE FOR CUTTING SHEET MATERIAL

Carl J. Anderson, Chicago, Ill.

Application July 25, 1945, Serial No. 607,018

20 Claims. (Cl. 164—19)

1

The invention relates generally to machines for cutting sheet material and more particularly to a machine of such character adapted for use with a detached or loose die, that is, a die which is normally disconnected from the machine and is adapted to be placed on the sheet material and then contacted by a part of the machine to effect the cutting action.

Cutting work of this character is performed in many industries and particularly in industries making leather goods where numerous types of small pieces of irregular form are cut. The method heretofore frequently applied in cutting such articles is to place the leather on a wood cutting block, then place the cutting die on the leather, and finally deliver a blow to the die by means of a mallet. The mallet used is of substantial weight and the operation, when performed constantly, requires a man of considerable strength to be capable of wielding the mallet continually without tiring.

Machines have heretofore been developed by which it has been attempted to eliminate such hand work, but such machines effect cutting by means of pressure applied to the die as distinguished from delivering a hammer blow to the die. Cutting by pressure is objectionable in many instances since it is a relatively slow operation and, principally, because as clean and sharp a cut cannot be made by mere pressure. The die, in such case, tends to compress the material to be cut before actual cutting takes place, leaving a somewhat rounded edge on the material and frequently a raggedness unless the die is maintained in an extremely sharp condition.

These difficulties are eliminated when the cutting is effected by a hammer blow. The cutting edge of the die is driven through the material without any substantial tendency to first compress the material, and the resulting edge of the material is thus sharp and square, a condition which, of course, is highly desirable. The extreme sharpness of the dies, thus, does not have to be maintained to the extent necessary where the cutting is effected by pressure. Morever, the work may be performed more rapidly than with pressure, since a hammer blow is obviously quicker than a pressing action, and the machine may be of lighter construction and, therefore, less cumbersome to handle. It is also found that less power is required to operate a machine of such character and there is less penetration of the cutting block by the die, so that the block lasts longer without resurfacing.

The general object of the invention is, therefore, to provide a novel machine of the foregoing general character, which effects a cutting action by delivering a hammer blow to the cutting die as distinguished from effecting the cutting by mere pressure.

Another object is to provide a novel machine of the foregoing character, which is convenient to operate, rugged in construction without being unduly heavy, and is adaptable to different types of dies.

A further object is to provide a novel machine of the foregoing character, in which the force of the hammer blow delivered to the die may be varied to suit the size, thickness and character of the material being cut.

Still another object is to provide a machine of the foregoing character, which includes means for delivering a hammer blow to a cutting die, said means being carried by a swingable arm and being so constructed that no sizable counterthrust is placed on the arm when the blow is delivered, thereby avoiding the necessity of supporting the arm for excessive stresses.

A still further object is to provide, in a machine of the foregoing character, a novel means for delivering a hammer blow, which is capable of delivering a sharp blow of considerable force, which is easily controlled, and which is of simple construction.

Other objects and advantages will become apparent from the following description taken in connection with the accompanying drawings, in which:

Figure 1 is a perspective view of a machine embodying the features of the invention.

Fig. 2 is a vertical sectional view of the means for delivering a hammer blow.

Fig. 3 is a transverse sectional view taken on the line 3—3 of Fig. 2.

Fig. 4 is a sectional view taken on the line 4—4 of Fig. 2.

Fig. 5 is a fragmentary perspective view showing a modification adapted for use with a different type of die than that shown in Fig. 1.

The machine shown herein comprises a base 10 adapted to rest on the floor and supporting a column 11, the latter preferably extending upwardly from the rear portion of the base 10. The column 11 in the present instance is cylindrical in form and supports a table 12 for vertical adjustment on the column. To effect such adjustment, a screw 13 extends upwardly from the base 10 and is provided with a nut 14 rotatably secured to the bottom of the table 12 and adapted to be rotated by means of a hand wheel 15.

The table 12 is of considerable area and is adapted to support on its upper surface a cutting block 16, which may be of any desired size. The cutting block is usually made of wood and may be resurfaced to maintain its upper face in level condition. The sheet material to be cut is placed upon the cutting block 16 and a die 17 is placed thereover to effect the cutting when a blow is delivered to the die. The die 17 in the present instance is of the type provided with cutting edges 20, a top plate 21 and a shank 22 extending upwardly therefrom and adapted to receive the blow which effects the cutting action.

Positioned above the table 12 is a means for imparting a blow to the die, which in the present instance is adapted to be swung to any position over the entire area of the table 12 so that the cutting block and die may be placed on the table as desired. The means for delivering the blow is preferably made readily movable over the area of the table, not only in order to properly place it in relation to the die, but also so that it may be swung out of the way after each blow to facilitate the operator's placing the material and die on the cutting block.

In the present instance, the means for delivering a blow is mounted on a double-jointed arm carried by the column 11. The arm in the present instance comprises a pair of inner members 23 rotatably mounted on the column 11 in vertically spaced relation with an outer member 24 pivotally supported between and by the free ends of the inner members 23. The inner members 23 are preferably provided with anti-friction bearings 25 at their point of connection with the column so that the arm may be freely swung about the column. On the outer end of the outer member 24 is mounted the means for delivering a blow to the die, which means is indicated generally at 26.

As heretofore mentioned, the present machine effects the cutting action by delivering a sharp hammer blow to the die. To this end, the means 26 comprises a hammer 30 to which a force is applied to initiate movement thereof, but which delivers the blow substantially solely by the momentum of the hammer. Thus, a sharp blow of considerable force is delivered to the cutting die 17 and the material is thereby given a sharp, clean cut without any tendency to compress the material prior to effecting the cut.

In the present instance, the hammering means 26 is so constructed as to cause the hammer 30 to deliver one blow, under the control of the operator, and thereafter be retained in its inactive position. In its preferred form, the hammering means 26 utilizes pneumatic pressure to impart a driving force to the hammer and comprises a cylinder 31 having a head 32 closing its upper end, and a closure member 33 for closing the lower end of the cylinder. The closure member 33 is provided with a tubular extension 34 for slidably guiding the hammer 30 when the latter is delivering a blow. Preferably, the hammer 30 is provided with a detachable hammer head 35 so that it may be readily replaced in case it becomes marred and uneven from use. In the present instance, the hammer 30 is provided with a reduced end 36 entering a bore in the head 35, and the head 35 abuts against the shoulder formed by the reduced end 36 to take the force of the blow, a cross pin 37 being provided to retain the head 35 on the hammer 30.

The hammer 30 constitutes a shank portion for a piston 40 operable in the cylinder 31. The piston 40 normally, when the hammer is in inactive position, is located as shown in Fig. 2, and air under pressure is adapted to be applied to the upper end of the piston 40 to drive the hammer downwardly. To this end, an inlet port 41 is provided, and the flow therethrough is controlled by a valve 42 normally held in closed or seated position against a gasket 43 by means of a coiled spring 44. The valve 42 is adapted to be tilted from its closed position to permit air under pressure to enter the upper end of the cylinder 31 through the port 41. The valve in its preferred form is adapted to tilt about its bottom edge and is provided with a plurality of notches 45 in its upper peripheral portion so that, when tilted from its vertical or closed position as shown in Fig. 2, the air under pressure may readily flow around the valve to rapidly bring the upper end of the cylinder up to the pressure of the air supply line. To hold the valve 42 in position and prevent it from rotating about its axis, a small pin 46 may be inserted in the body of the valve and in a notch in the lower portion of the valve.

To effect actuation or opening movement of the valve against the pressure of the spring 44 and the pressure of the air in the supply line, the valve 42 is provided with an integral stem 47 extending toward the port 41. Mounted for sliding movement transversely of the stem 47 is a plunger 50, the upper end of which is engageable with the free end of the stem 47. By an inspection of Fig. 2 of the drawings, it will be apparent that upward movement of the plunger 50 will cause the valve 42 to tilt away from its seat and thus permit air under pressure to enter the cylinder through the port 41. The plunger 50 is normally held in an inactive position and to this end is provided with a flange 51 on its lower end which is engaged by a coiled spring 52 bearing at its other end against the valve body to force the plunger 50 downwardly. After tilting movement of the valve 42 by the plunger and retraction of the plunger under the force of its spring 52, the coiled spring 44 in the valve body immediately causes the valve 42 to be seated and thus shut off the supply of air to the cylinder.

The plunger 50 is adapted to be moved upwardly against the force of the spring 52 by means of a rod 53 slidably supported by the cylinder structure. The rod 53 at its upper end is provided with a screw 54, the head of which abuts against the plunger 50. Adjustment of the screw 54 thus may be utilized to regulate the relative position of the rod 53, the plunger 50 and the valve stem 47. The plunger 53 extends downwardly below the arm which supports the cylinder and is adapted to be actuated by means of hand lever 55 pivotally supported at 56 by the cylinder structure. The hand lever 55 is provided with a nose portion 57 adapted to engage the lower end of the rod 53 so that, when the hand lever 55 is drawn toward the extension 34 of the cylinder closure 33, the nose portion 57 forces the rod 53 upwardly to cause the plunger 50 to open the valve 42.

In the operation of the hammer, the full line pressure of the air is permitted to build up within the upper end of the cylinder 31 before the cylinder is permitted to move downwardly. Thus, a large force is provided to initiate movement of the hammer. For this purpose, the hammer is provided with retaining means which holds it in its upper or inactive position until manually released. As shown herein, the retaining means comprises a bar 60 mounted in a groove 61 in the shank portion 30 of the hammer. The bar, at its upper end, is provided with a hook 62 to engage a spring ring 63 embracing the shank portion 30. The spring 63 thus serves as a pivot for the retainer. A coiled spring 64 is mounted in a transverse bore provided in the shank portion 30 and engages the bar 60 below its pivot to force the bar to swing outwardly from the shank portion.

To retain the piston in its upper or inactive position, the bar 60 is adapted, when swung outwardly from the shank portion 30, to engage an abutment provided in the cylinder. In the present instance, the abutment comprises an antifriction roller 65 rotatably mounted in the closure member 33 for the lower end of the cylinder. The roller 65 lies in a plane extending radially of the shank portion 30 and is preferably of sufficient diameter to extend slightly into the groove 61 to prevent the shank portion 30 from turning about its own axis. The bar 60, at its lower end, engages the roller 65 at a point outwardly of a line joining the axis of the roller and the pivotal axis of the bar so that downward pressure on the piston tends to hold the retainer in engagement with the roller 65.

The bar 60 is adapted to be held in retaining engagement with the roller 65 until after pressure builds up in the upper end of the cylinder, and then be released to permit downward movement of the hammer initiated by the pressure above it. To effect this result, a plunger 66 is mounted in the wall of the cylinder and normally is held in an outward position by a spring 67 to cause the plunger 66 to engage the hand lever 55. The inner end of the plunger 66 is engageable with the lower end of the retaining bar 60. When the hand lever 55 is actuated, such actuation first opens the valve 42. During the movement required to open the valve, the plunger 66 is moved against the retainer bar 60 and shifts it to the left, as shown in Fig. 2, so that it is moved across the line connecting the axis of the roller 65 and the pivot 62, to a point where downward pressure on the piston will cause the bar to be cammed completely into the groove 61 and clear of the roller 65. The proportions of the parts are so arranged that the air pressure in the upper end of the cylinder will build up to that existing in the supply line before the retainer clears the roller 65. Thus, full pressure in the upper part of the cylinder is available to force the piston and hammer downwardly at the time that the retainer bar 60 permits such downward movement. During the downward movement, the roller 65 engages the side face of the bar 60 to hold it within the groove 61.

The height of the table 12 is adjusted so that the upper end of the shank 22 of the die is immediately below the extension 34 of the closure 33 for the cylinder. Thus, when the hammer is driven downwardly, the head 35 thereof will engage the die to deliver its blow substantially at the time that the head 35 emerges from the lower end of the extension 34. As a safety measure, the lower end of the cylinder is provided with a cushion 70 to engage and stop the piston 40 in case the hammer is actuated at a time when the die is not in position to stop movement of the hammer. The cushion 70 is provided with a notch 71 to provide for freedom of movement of the retainer bar 60 and is held in place as by a screw 72 extending through the cylinder wall.

The hammer is adapted to be returned to its upper or inactive position by means comprising in the present instance a coiled spring 73 in the upper part of the cylinder 31. The air pressure within the upper part of the cylinder, which drives the hammer downwardly, also functions to stretch the spring 73 and energize it to effect return of the piston to its upper position. However, the air pressure within the upper portion of the cylinder must be relieved before the spring 73 is free to draw the piston upwardly. To this end, the cylinder 31 is provided with a plurality of bleed ports 74 adjacent its lower end, but so positioned that they are open to the upper portion of the piston when the piston moves to its lower or blow-delivering position. Thus, when the piston moves downwardly and at a point just before the blow is delivered to the die, the piston 40 moves past the bleed ports 74 to permit the air pressure therein to be relieved. At this time, the valve 42 is preferably closed by previous release of the hand lever 55. Thus, since the pressure in the cylinder is relieved prior to the time the hammer delivers its blow, such blow is due solely to the momentum of the hammer.

Upon relief of pressure in the cylinder and after the hammer has delivered its blow, the spring 73 is free to draw the piston and hammer upwardly toward its inactive position. However, as soon as the piston 40 has moved a slight distance upwardly, the bleed ports 74 are closed by such movement. To permit the upper portion of the piston to continue to be relieved of air pressure, the spring 73, at its upper end, is connected to an exhaust valve plate 75. For this purpose, the spring 73, at its upper end, is wound around a nut 76 threaded on the end of an exhaust valve stem 77. A retainer cap 78 may be mounted about the nut 76 to hold the spring turns thereon against expansion. The nut 76 clamps the exhaust valve plate 75 against a shoulder 80 provided on the exhaust valve stem 77, and the stem extends upwardly through the cylinder head 32 for sliding movement therein. The upper end of the exhaust valve stem 77 carries a washer 81 and is threaded as at 82 to receive a nut 83 holding the washer 81 on the stem. Between the washer 81 and the cylinder head 32 is positioned a coiled spring 84 acting oppositely to the return spring 73. The upper end of the exhaust valve stem together with the nut 83, washer 81 and coiled spring 84 are preferably enclosed by a cap 85.

The cylinder head 32 is provided with a gasket 86 against which the exhaust valve plate 75 seats and with a plurality of exhaust ports 87 opening to the outside. When the upper end of the cylinder 31 is under pressure, such pressure tends to maintain the exhaust valve plate 75 seated against its gasket 86 to hold the ports 87 closed. Thus, during the downward movement of the hammer, the return spring 73 alone is stretched. However, as soon as the bleed ports 74 are opened by the movement of the piston 50, pressure within the upper end of the cylinder is reduced sufficiently to permit the downward pull of the return spring 73 on the exhaust valve plate 75 to shift the plate 75 downwardly a short distance, compressing the spring 84 and thereby opening the exhaust ports 87. The spring 84 is substantially lighter than the return spring 73 so that as soon as the pressure is relieved in the upper end of the cylinder, such action will take place. Thus, when the bleed ports 74 are closed by upward movement of the piston 40, the exhaust ports 87 remain open to permit air to be exhausted from the cylinder and the piston 40 moved upwardly under the influence of the return spring 73. When the energy stored in the return spring 73 has been expended and the piston 40 has moved to its upper or inactive position, the spring 84 expands to seat the exhaust valve plate 75 and close the exhaust ports 87. At the same, the retainer bar 60 has reached a point in its upward travel where its spring 64 will cause it to swing outwardly and engage on top of the roller 65 to hold the hammer in its upper position. The lower end of the return spring 73 is secured to the piston 40 by being hooked over a cross pin 90.

The bleed ports 74 are preferably placed so that, when pressure in the upper end of the cylinder is relieved, the air will not be exhausted in a direction to disturb the operator of the machine. To this end, the cylinder 31 is provided with a rearwardly extending portion 91 shaped in cross section to conform to the outer member 24 of the swinging arm which supports the hammer. The arm 24 is preferably made in the form of an inverted U-shape and is provided with screw-receiving portions 92 through which screws 93 may extend to secure the member 24 and the rearwardly extending portion 91 together. As noted from Fig. 4, the bleed ports 74 open into a hollow part of the rearwardly extending portion 91 so that the air may be exhausted rearwardly therefrom and into the member 24. The exhaust ports 87 open upwardly so that air forced therethrough will not in any way disturb the operator using the machine.

In Fig. 5 of the drawings, I have shown the machine adapted for use with another form of die. In this figure, the die is of skeleton form comprising merely blade portions 100 shaped to cut the desired form from the sheet material. To utilize this form of die, a plate 101 is provided, which plate is adapted to be secured to the extension 34 of the cylinder closure 33. To this end, the plate is provided with an upwardly extending shank 102 which has a floating connection with the extension 34. Such floating action, in the present instance, is provided by a coiled spring 103 wound at its respective ends about the extension 34 and the shank 102. The plate 101 thus is flexibly carried by the extension 34 so that the plate may rest flat against the die 100. In order to be sure that the hammer will deliver a blow squarely against the plate 100, the upper end of the shank 102 is provided with a spherical surface 104 against which a spherically formed block 105 rests, the block 105 being positioned to receive the blow from the hammer head 35.

In operation, the operator places the sheet material on the cutting block 16 and lays the die 17 thereon, selecting the portion of the sheet material to be cut by the die. He then swings the arm comprising the members 23 and 24 so as to bring the extension 34 of the hammering means in direct alignment with the shank 22 of the die. The table is adjusted to such height that the extension 34 just clears the shank 22 of the die so that the hammer head 35 may strike the shank 22 just as the head 35 emerges from the portion 34. Movement of the arm and the hammering means may be readily effected by grasping the extension 34 in the hand and swinging the arm, the anti-friction bearings 25 and the joint connecting the members 23 and 24 permitting such movement under easy pressure.

To deliver the blow, the operator draws the hand lever 55 forwardly, the lever being conveniently located so that it may be grasped by the same hand used for grasping the extension 34. Actuation of the hand lever first causes the valve 42 to open and permit the air to flow into the upper end of the cylinder through the port 41. Such flow takes place rapidly so that the pressure therein reaches that of the line by the time that the hand lever 55 has shifted the retainer bar 60 far enough so that it will, under the pressure in the upper end of the cylinder, cam by the roller 65 to permit the hammer to move downwardly.

Downward movement of the hammer is initiated by the pressure in the upper end of the cylinder, but the actual blow delivered by the hammer is due substantially entirely to the momentum of the hammer since the pressure in the upper end of the cylinder is relieved by the bleed ports 74 shortly before the hammer head 35 delivers the blow to the die. The force of the blow may, of course, be controlled by the initial pressure in the upper end of the cylinder and for that purpose the line pressure may be adjusted to control the force of the blow delivered by the hammer. In this way, ready adjustment of the blow may be accomplished and excessive cutting through the sheet material and into the cutting block by the die may be prevented. At the same time, sufficient initial pressure may be provided to produce a blow of ample force to effect the desired cutting action.

Downward movement of the piston 40 causes the spring 73 to be stretched, and as soon as the bleed ports 74 are opened, relief of the pressure in the upper end of the cylinder permits the exhaust valve plate 75 to open since there is no longer any pressure to hold it in its closed position. The tension in the spring 73 thereupon partially compresses the auxiliary spring 84 so that the exhaust ports 87 are thereby opened to permit exhaust of air from the upper part of the cylinder when the piston 40 is moving upwardly. When the piston 40 reaches its upper or inactive position, as shown in Fig. 2, the spring 64 shifts the retainer bar 60 outwardly to engage over the top of the roller 65 and hold the hammer in its upper position until the hand lever 55 is again actuated.

By utilizing a hammering blow as distinguished from mere pressure, there is no upward counterthrust on the hammer-supporting arm resulting from the blow since the blow is delivered purely by the momentum of the hammer. Utilization of the hammer type of blow results in speedier cutting action, not to mention the cleaner cutting effect. Moreover, the hammer means can be more compactly constructed than a means for effecting pressure so that it occupies less space. It has also been found that less power is required to operate the machine and, by careful adjustment of the air pressure utilized, a minimum of penetration into the cutting block is effected. This represents a saving since the cutting block will not have to be resurfaced as frequently.

The lighter construction of the hammer and the fact that there is no counterthrust resulting therefrom means that the supporting arm for the hammer is less cumbersome and thus does not hide the work to the extent that would be necessary in the pressure type of machine. The arm, therefore, does not have to be moved to the extent required if the machine were of the pressure type and, similarly, because of the lighter construction, it may be more easily moved.

I claim:

1. In a machine of the character described, a cylinder, a hammer comprising a piston portion positioned within the cylinder and a shank portion extending from one end thereof, means for supplying air under pressure to said cylinder, a valve controlling said means, a retainer shiftably carried by said shank portion, an abutment on said cylinder adapted to be engaged by said retainer to hold the hammer against movement, and a manually operable member for first opening said valve and thereafter shifting said retainer out of engagement with said abutment.

2. In a machine of the character described, a cylinder, a hammer comprising a piston portion positioned within the cylinder and a shank portion extending from one end thereof, means for supplying air under pressure to said cylinder, a valve controlling said means, said shank portion having a longitudinal groove, a retainer pivotally mounted in said groove and adapted to swing outwardly therefrom, an abutment on said cylinder adapted to be engaged by the free end of said retainer when the latter is swung outwardly, and manually operable means for first opening said valve and thereafter shifting said retainer out of engagement with said abutment to lie wholly within said groove.

3. In a machine of the character described, a cylinder, a hammer comprising a piston portion positioned within the cylinder and a shank portion extending from one end thereof, means for supplying air under pressure to said cylinder, a valve controlling said means, said shank portion having a longitudinal groove extending from said piston portion, a retainer comprising an elongated shank and a hooked head and mounted in said groove, a ring fitting about the shank portion of the hammer and under said hooked head to pivotally hold the retainer in said groove, a spring mounted in said shank portion tending to swing said retainer outwardly, an abutment on said cylinder adapted to be engaged by the free end of said retainer when swung outwardly, and manually operable means for first opening said valve and thereafter shifting said retainer out of engagement with said abutment to be wholly within said groove.

4. In a machine of the character described, a cylinder, a hammer comprising a piston portion positioned within the cylinder and a shank portion extending from one end thereof, means for supplying air under pressure to said cylinder, a valve controlling said means, an elongated retainer pivotally secured at one end to lie along said shank portion, a roller rotatably mounted in said cylinder in a plane extending radially thereof, said roller being adapted to be engaged by the free end of said retainer in an over-center position to hold the hammer against movement, and manually operable means for first operating said valve and thereafter shifting said retainer across the center of said roller whereby the latter will cause the retainer to shift out of engagement therewith to permit movement of the hammer.

5. In a machine of the character described, a cylinder, a hammer comprising a piston portion positioned within the cylinder and a shank portion extending from one end thereof, means for supplying air under pressure to said cylinder, a valve controlling said means, said shank portion having a longitudinal groove, an elongated retainer pivotally mounted in said groove, a roller mounted in said cylinder and adapted to be engaged by the free end of said retainer in an over-center position to hold the hammer against movement, and manually operable means for first opening said valve and thereafter shifting said retainer across the center of said roller, the latter causing the retainer to shift its free end out of engagement therewith to permit movement of the hammer, said roller bearing against the side of the retainer during such movement to hold the retainer in the groove.

6. In a machine of the character described, a cylinder, a closure for one end of said cylinder having a tubular extension coaxial with said cylinder, a hammer comprising a piston portion mounted in said cylinder and a shank portion extending into said extension, means for supplying air under pressure to said cylinder, a valve for controlling said means, a retainer shiftably carried by said shank portion, an abutment in said cylinder adapted to be engaged by said retainer to hold the hammer against movement, manually operable means for first opening said valve and thereafter disengaging said retainer from said abutment to permit movement of the hammer, and a hammer head detachably secured to the end of said shank portion and adapted to be projected beyond the end of said tubular extension to deliver a blow.

7. In a machine of the character described, a cylinder, a closure for one end of said cylinder having a reduced tubular extension coaxial with said cylinder, a hammer comprising a piston portion mounted in said cylinder and a shank portion slidably supported by said tubular extension, means for supplying air under pressure to said cylinder to drive said piston portion toward said closure and the end of said shank portion beyond said tubular extension to deliver a blow, releasable means for holding the hammer against movement, manually operated means for opening said valve and thereafter releasing said releasable means to cause the hammer to deliver a blow, and cushioning means within the cylinder adjacent said closure adapted to be engaged by said piston portion in case movement of the hammer is not previously stopped by delivering a blow.

8. In a machine of the character described, a cylinder, a hammer having a piston portion mounted in said cylinder, means for supplying air under pressure to said cylinder, a valve for controlling said means and comprising a tiltable valve member, a rod for tilting said valve, a releasable retainer for holding said hammer against movement, and manually operable means for first actuating said rod to open the valve and thereafter releasing said retainer.

9. In a machine of the character described, a cylinder, a hammer having a piston portion mounted in said cylinder, means for supplying air under pressure to said cylinder, a valve for controlling said means and comprising a body having a passage with an enlarged portion to provide a shoulder, a valve member mounted in said enlarged portion to seat against said shoulder and having a stem extending into the passage, a rod projecting transversely into said passage for tilting said valve member off its seat, a releasable retainer for holding said hammer against movement, and manually operable means for first actuating said rod to open said valve and thereafter releasing said retainer.

10. In a machine of the character described, a cylinder, a hammer having a piston portion mounted in said cylinder, means for supplying air under pressure to said cylinder, a valve for controlling said means and comprising a body having a passage with an enlarged portion to provide a shoulder, a valve member comprising a disk pivotally mounted at one side and having a plurality of notches at its opposite side and adapted to seat against said shoulder, a spring bearing against said disk and tending to seat it, a stem extending from the face of said disk into said passage, a rod projecting transversely into said passage to engage said stem and tilt said valve member, a releasable retainer for holding said hammer against movement, and manually operable means for first actuating said rod to unseat said valve member and thereafter release said releasable means.

11. In a machine of the character described, a cylinder, a hammer having a piston portion mounted in said cylinder, means for supplying air under pressure to said cylinder, a valve for controlling said means, a rod for opening said valve, a plunger for actuating said rod and adjustable in length, a releasable retainer for holding said hammer against movement, and a manually operable member for first actuating said plunger and thereafter releasing said retainer.

12. In a machine of the character described, a cylinder, a hammer having a piston portion mounted in said cylinder, means for supplying air under pressure to said cylinder, a valve for controlling said means, a rod for opening said valve, a spring opposing movement of said rod, a releasable retainer for holding the hammer against movement, a pin movable to release said retainer, a spring opposing movement of said pin, and a manually operable member for actuating said rod and said pin against the pressure of their respective springs, said springs thereby tending to hold said manually operable member in position for actuation.

13. In a machine of the character described, a cylinder, means for admitting air under pressure to one end of the cylinder, a valve for controlling said means, a hammer comprising a piston portion within the cylinder and a shank portion extending from the other end of the cylinder, releasable means for holding the hammer against movement, manually operable means for actuating said valve and thereafter releasing said releasable member, and a spring adapted to be energized by movement of the hammer for returning the hammer to its initial position.

14. In a machine of the character described, a cylinder, means for admitting air under pressure to one end of the cylinder, a valve for controlling said means, a hammer serving as a piston in said cylinder and movable toward the other end of the cylinder, releasable means for holding the hammer against movement, manually operable means for actuating said valve and thereafter releasing said releasable means, a spring adapted to be energized by movement of the hammer when released for returning the hammer to its initial position, and exhaust means for the cylinder adapted to be opened by movement of the hammer toward said other end to relieve the pressure in the cylinder.

15. In a machine of the character described, a cylinder, means for admitting air under pressure to one end of the cylinder, a valve for controlling said means, a hammer serving as a piston in said cylinder and movable toward the other end of the cylinder, releasable means for holding the hammer against movement, manually operable means for actuating said valve and thereafter releasing said releasable means, means adapted to be energized by movement of the hammer when released for returning the hammer to its initial position, bleed ports adjacent said other end of the cylinder adapted to be opened by movement of the piston toward said other end to relieve the pressure in the cylinder, and exhaust means adapted to be opened by relief of pressure in the cylinder to prevent pressure from opposing return of the piston to its initial position.

16. In a machine of the character described, a cylinder, means for admitting air under pressure to one end of the cylinder, a valve for controlling said means, a hammer serving as a piston in said cylinder and movable toward the other end of the cylinder, releasable means for holding the hammer against movement, manually operable means for actuating said valve and thereafter releasing said releasable means, a spring adapted to be energized by movement of the hammer when released and for returning the hammer to its initial position, bleed ports adjacent said other end of the cylinder adapted to be opened by movement of the piston toward said other end to relieve the pressure in the cylinder, an exhaust valve secured to said spring whereby said spring when energized tends to open said valve, and a second spring tending to hold said exhaust valve closed, the pressure in the cylinder tending to hold said exhaust valve closed, the first spring overcoming the second spring to open the exhaust valve when the pressure is relieved by said bleed ports.

17. A machine of the character described, including a table for carrying a work-supporting cutting block, a hollow arm swingable over the table, a cylinder mounted on a vertical axis on the free end of said arm, a hammer serving as a piston in said cylinder, means for supplying air under pressure to said cylinder to effect a driving blow by the hammer, bleed ports in the cylinder to relieve the pressure therein when the hammer delivers its blow, and exhaust means for said cylinder adapted to be opened when the pressure is relieved to permit return of the hammer to its initial position, said bleed ports opening into said hollow arm and said exhaust means opening upwardly in the upper end of the cylinder to avoid discharging air toward the operator.

18. A machine of the character described, including a table for carrying a work-supporting block, an arm swingable over the table, a cylinder mounted on a vertical axis on the free end of said arm and having a tubular extension of reduced diameter on its lower end, a hammer having a piston portion operable in said cylinder and a shank portion slidably supported by said tubular extension, said tubular extension being adapted to be grasped by the hand to swing the hammer to the desired position, means for supplying air under pressure to the cylinder to effect a driving blow of the hammer, a releasable retainer for holding the hammer against movement, and a hand lever for controlling said air supply means and for releasing said retainer, said hand lever extending adjacent said tubular extension to be readily grasped when said tubular extension is grasped.

19. A machine of the character described, comprising a table for carrying a work-supporting block, an arm swingable over the table, a cylinder mounted on a vertical axis on said arm, a hammer having a piston portion operable in said cylinder, means for supplying air under pressure to said cylinder, a releasable retainer for holding the hammer against movement, manually operable means for controlling said air supply means and for releasing said retainer after air pressure has built up in said cylinder, and means for relieving the pressure in said cylinder prior to the delivery of a blow by said hammer whereby the force of the blow is due solely to the momentum of the hammer and counterthrust against the arm is avoided.

20. A machine for cutting sheet material, comprising a table for carrying a work-supporting block, an arm swingable over said table, a cylinder mounted on the free end of said arm and having a tubular extension on its lower end, a hammer mounted in said cylinder and slidably guided by said extension, and a die-engaging plate adapted to be struck by said hammer and having a floating connection with said tubular extension to permit said plate to lie flat against the die.

CARL J. ANDERSON.

REFERENCES CITED

The following references are of record in the file of this patent:

UNITED STATES PATENTS

| Number | Name | Date |
|---|---|---|
| 1,091,707 | Reed | Mar. 31, 1914 |
| 1,994,178 | Raiche | Mar. 12, 1935 |
| 2,241,184 | Clark | May 6, 1941 |